United States Patent Office 2,925,973
Patented Feb. 23, 1960

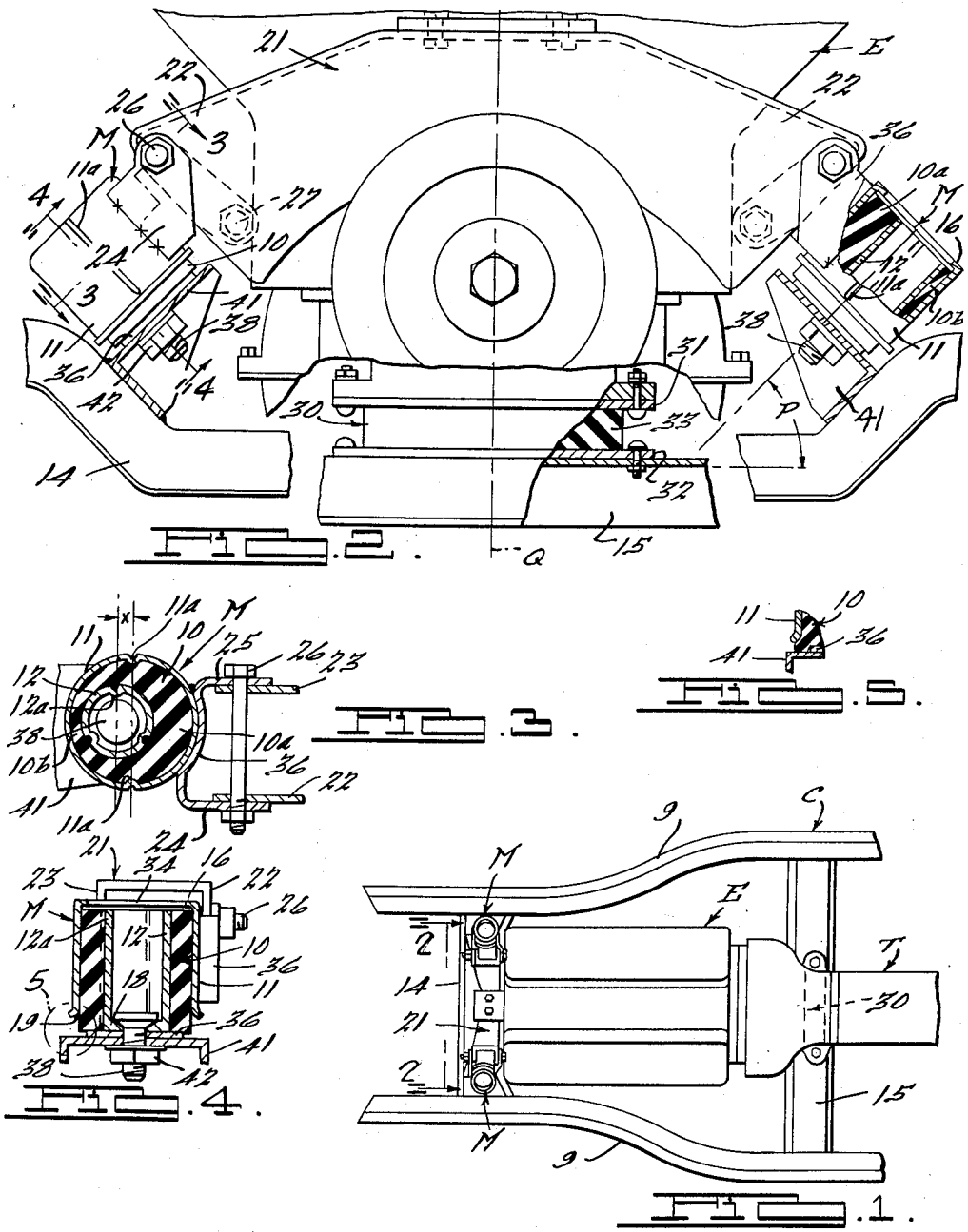
Feb. 23, 1960     F. C. AEBERSOLD     2,925,973
ECCENTRIC SLIP FRICTION VIBRATION DAMPING MOUNT
Filed Nov. 19, 1956
INVENTOR.
Frederick C. Aebersold
BY
Harness and Harris
ATTORNEYS.

2,925,973

ECCENTRIC SLIP FRICTION VIBRATION DAMPING MOUNT

Frederick C. Aebersold, Farmington, Mich., assignor to Chrysler Corporation, Highland Park, Mich., a corporation of Delaware Application November 19, 1956, Serial No. 623,238

5 Claims. (Cl. 248—9)

This invention relates to resilient, vibration damping, mounting means for suspended, movable objects and particularly to engine mounts for motor vehicles. This invention is an improvement over that shown in the related, commonly-owned, co-pending application of Francis G. Sullivan, Serial No. 622,579, filed November 16, 1956.

It is an object of this invention to provide a resilient, plunger-type, engine mount wherein the resilient material thereof is free to move relative to other associated portions of the mount such that sliding friction can be used to supplement the shear and compressive effects that are developed in the resilient material during its vibration damping action.

It is still another object of this invention to provide an eccentrically shaped, resilient, plunger-type, engine mount wherein the major portion of the resilient mount material is positioned so as to be effective to support the engine and to damp engine vibration.

Other objects and advantages of this invention will become readily apparent from a reading of the following description and a consideration of the related drawings wherein:

Fig. 1 is a top plan view of the engine supporting end of a motor vehicle chassis frame having engine mounts embodying this invention;

Fig. 2 is an enlarged, fragmentary, front end elevational view, partly in section, of the Fig. 1 structure, the view being taken as indicated by the arrows 2—2 of Fig. 1;

Fig. 3 is a fragmentary sectional elevational view taken along the line 4—4 of Fig. 2 looking in the direction of the arrows;

Fig. 4 is another fragmentary sectional elevational view taken along the line 4—4 of Fig. 2 looking in the direction of the arrows; and Fig. 5 is an enlarged, fragmentary, sectional elevational view of that portion of the engine mount included within the circle 5 of Fig. 4, the view being taken when the mount is under load to show the deformation of portions of the resilient material of the mount.

These novel motor mountings in general consist of a spool or cylinder of rubber-like material 10 eccentrically arranged between a pair of encircling, contiguous, outside and inside metal shells 11 and 12. The outer shell 11 is attached to the engine block E and the inner shell 12 is attached to a chassis frame cross member 14. The spool of rubber-like material 10 is engaged with but is not bonded to either shell 11, 12 therefore it is free to slidably move within the confines of the shells 11, 12.

Low-speed engine movement, which occurs at engine idle speed, is effectively damped by this type of mount due to the combined action of the rubber-like material 10 acting in shear, in compression, and in friction resulting from the slippage of the rubber-like spool 10 relative to the metal shells 11, 12. The upper end 16 of the outer shell 11 is rolled over the upper end of the outer periphery of the rubber-like spool 10 and the lower end 18 of the inner shell 12 has a large spool retaining washer 19 attached thereto to prevent separation of the several parts of the mounting. During relative axial movement between the shells 11, 12 and the resilient rubber-like spool 10, the rubber-like spool is placed in shear because of the construction wherein the shell lip 16 and washer 36 do not completely cover the ends of the spool 10. Also during axial movement of the spool 10 along the shells 11, 12 sliding friction is developed. Rocking of the engine about its roll axis will cause compression of the spools 10. High-frequency engine noise and vibration, that might develop at high engine speeds, is also effectively isolated by this resilient mount wherein the resilient material thereof acts in compresion, shear and also provides friction damping. Fore-and-aft movement of the associated engine is restricted since this engine motion places the rubber-like material 10 in compression.

Not only is this unbonded motor mount more efficient in operation than the conventional bonded resilient mount but it is thought to be rather obvious that the unbonded mount is cheaper to produce. No bonding is required and thus the cost of this operation is eliminated. Also, because a welding operation destroys a bond in the area adjacent the weld, it has been necessary to do any welding of studs or flanges on the mount before the bonding operation and this was often inconvenient and costly. With the unbonded mount welding can be done at any time. Furthermore, the manufacture and assembly of the unbonded mount can be done by unskilled labor along an assembly line whereas the bonded type of mount had to be manufactured in a plant having vulcanizing equipment and the like. The unbonded mount permits fabrication of the mount by the motor vehicle manufacturer whereas the bonded type of mount was normally purchased from a rubber company or the like that was set up to accomplish the bonding operation. The economics of the situation is such as to make the unbonded mount preferred to the bonded type of mount particularly where the performance of the unbonded mount is superior to the bonded type of mount.

Fig. 1 of the drawings shows a motor supporting portion of a vehicle chassis frame C that includes a pair of spaced side rails 9, 9 that are interconnected by frame cross members 14 and 15. Mounted on the frame cross members 14, 15 between the side rails 9, 9 is an engine E which in the case shown is of the V-type. The front end of the engine E is connected to the front frame cross member 14 by a pair of spaced engine vibration damping mounts M, M. Front motor mounts M, which are subsequently described in detail, involve the invention herein disclosed.

The engine block E has connected thereto at the front end a channel-shaped front end supporting member 21. This supporting member 21 provides at each side of the engine E a pair of spaced, depending, flanges 22, 23 (see Fig. 3) Engine support flanges 22, 23 have the supporting flanges 24, 25 of the mounts M connected thereto by the bolts 26, 27. It will be noted that the upper bolt 26 is connected to each of the mount flanges 24, 25 whereas the lower bolt 27 is connected to only the rearwardly positioned mount flange 25. The specific arrangement may be varied to suit the particular design of the engine and chassis frame that are connected by the mounts M.

The rear end of the engine E has the transmission structure T rigidly fixed thereto. The transmission structure T, as well as the rear end portion of the engine E, are supported on the chassis frame rear cross member 15 by a resilient, sandwich-type, engine mount 30. Rear engine mount 30 (see Fig. 2) is more or less conventional and comprises a plate 31 bolted to the transmission structure T, a plate 32 bolted to the frame cross member 15, and an intermediate rubber-like pad 33 positioned between and bonded to the plates 31, 32.

The front engine mounts M, which involve this invention, are identical so only one will be described in detail. Mount M comprises an outer metal tubular shell 11 that is preferably of cylindrical shape. Shell 11 can initially be a cylindrical metal cup and then the closed end of the cup can have a disc 36 punched therefrom to provide the opening 34 at the upper end of the shell (see Fig. 4). The disc 36 that is punched from the cup-like shell 10 can be used as the washer 36 (see Fig. 4) for mounting of the rubber sleeve 10 within the shell 11. It will be noted that the edge portion 16 at the upper end of the shell 11 extends radially inwardly so that it provides portions that overlie the top of the rubber sleeve 10 and prevent longitudinal movement of the resilient sleeve 10 through the open upper end 34 of the shell 11. The radially inwardly extending portion 16 of outer shell 11 is so designed that it permits deformation of the upper end of resilient sleeve 10 when it is subjected to compressive forces. Relative axial movement of the rubber-like spool 10 with respect to the shells 11, 12 will develop shear forces in the spool 10 and at same time sliding friction between the peripheral surfaces of the spool 10 and the shells 11, 12 will provide sound and vibration damping. The lower end edge 19 of the outer shell 11 is flared outwardly as clearly shown in Fig. 5. This flaring of the lower edge of the outer shell 11 prevents the lower edge of the shell 11 from cutting into the rubber-like sleeve 10 when compressive forces applied to rubber-like sleeve 10 cause its deformation. Flaring of the lower edge of outer shell 11 also has some softening effect on the mount M.

Welded or otherwise fastened to the outer side of the outer shell 11 is the support bracket 36 that carries the spaced apart support flanges 24, 25. The support flanges 24 and 25 are pierced by one or more apertures that are adapted to receive mounting bolts 26 and/or 27 for connecting the outer shell 11 to the engine block E.

The rubber-like resilient sleeve 10 that is mounted within the outer shell 11 is of such size that it fits snugly within the outer shell 11 yet is capable of limited sliding movement along the inner cylindrical surfaces of the outer shell 11. Resilient sleeve 10 is of sufficient thickness to provide a compressible mass that will dissipate engine vibration and noise in both compression and shear as well as by slipping friction of the sleeve 10 within the shell 11. The bore through sleeve 10 is offset by the amount X (Fig. 3) from the longitudinal axis of the sleeve 10 and the longitudinal axis of the outer shell 11 for a reason that will be subsequently explained.

Mounted within the axial bore through the resilient sleeve 10 is an inner metal shell member 12. Inner shell 12 is essentially a thin-walled cup that has a bolt-like connector 38 fixed to and piercing its lower closed end 18. Mounted on the downwardly projecting stud portion of bolt connector 38 is the washer 36. Washer 36 is of such a diameter that it overlaps a portion of the bottom of the resilient sleeve 10 to prevent disengagement of the sleeve 10 from the concentric shells 11, 12. Washer 36 will permit a deformation of the sleeve 10 adjacent the bottom end thereof when the sleeve 10 is placed under compression. The outside diameter of inner metal shell 12 is such that it snugly fits the axial bore in the resilient sleeve 10 yet permits sliding movement therebetween.

From Fig. 3 it will be noted that the inner and outer shell members 11, 12 are each formed with longitudinally extending depressed grooves 11a and 12a respectively. These grooves are designed to engage mating grooves formed in the inner and outer peripheral surfaces of the rubber-like sleeve 10. By this arrangement the sleeve 10 will be anchored against rotation relative to the shell members 11, 12. While grooves 11a, 12a have been shown in each of the shell members 11, 12, it is possible to prevent rotation of the sleeve 10 by the use of grooves in only one of the shell members 11, 12.

The chassis frame front cross member 14 is provided with a mounting bracket 41 at each side for receiving each of the front engine mounts M. Bracket 41 has a bore therein to receive the stud of connector 38 of mount M. A nut 42 fixedly connects the mount stud 38 to the chassis frame bracket 41.

The unbonded resilient sleeve mounts M hereinbefore described permit some limited, longitudinally directed, slipping of the rubber-like sleeves 10 relative to the inner and outer metal shells 11, 12 when certain types of forces are applied to the mounts. Accordingly, friction damping develops during this slipping movement that acts in series with the resilient sleeve 10 to assist in damping engine vibration and noise. The mounts M thus permit the most efficient use of the rubber-like material 10 for they add friction damping to the shear and compression action of the resilient material of the mounts. It is also thought to be obvious that when forces are applied to the mounts M that act in a direction extending axially of the rubber-like sleeve 10, that then the resilient material 10 of the mount can be deformed to a limited degree so that it can provide the most efficient vibration and noise damping action.

From an inspection of Fig. 2 of the drawings it will be noted that the front engine mounts M extend in a vertical plane at an angle P to the horizontal and converge downwardly towards the plane Q that includes the engine roll axis. Because of this mount angularity it is the upper or top half portions 10a of the resilient sleeves 10 that carry the majority of the radially acting compressive loads of the engine E. The lower or under half portions 10b of the resilient sleeves 10 are unloaded by radially acting static engine loads and the radially acting dynamic loads acting on portions 10b are of lower magnitudes that can be effectively controlled by the reduced cross-sectional lower mount portions 10b. By this invention an even more efficient use of the resilient sleeves 10 is made than that shown in the co-pending, related, commonly owned, application of Francis G. Sullivan, Serial No. 622,579, filed November 16, 1956. It is thought to be obvious that with the eccentric position of the resilient sleeves 10 with respect to the shell 11, 12, that a softer mount is produced for damping purposes over that shown in the aforementioned Sullivan application, Serial No. 622,579, even though the same amount of resilient material is used in each of these two types of mounts. With the eccentric type of slip friction engine mount herein disclosed the major portion of the resilient material of the sleeve 10 is positioned on the upper side of the inner plunger shell 12 and thus there is a maximum of resilient material positioned for effective vibration damping.

I claim:

1. A vibration damping mount comprising an open-ended, outer tubular shell member having portions at the top thereof shaped to provide inwardly extending obstructions to upwardly directed, longitudinal movement along the inner wall of the outer shell, a tubular spool of resilient, rubber-like, material arranged within said outer shell member with the outer peripheral surface thereof contiguous to and slidable axially along the inner wall of said outer shell, said resilient spool member having a bore therethrough that is eccentrically positioned with respect to the longitudinal axis of the spool and the upper end of said resilient spool member having portions engageable with the obstructions on the outer shell to prevent free movement of the resilient, rubber-like, spool member through the open top of the outer shell, and an inner plunger member arranged within the bore in said resilient spool member with the side surfaces of said inner plunger member contiguous to and slidable axially along the inner bore surface of the resilient spool member, said inner plunger member having obstructions connected thereto engageable with portions of the lower end of the resilient spool member to obstruct movement of the resilient spool member lengthwise of the inner plunger member towards the bottom end thereof, said obstructions cooperating with said resilient, rubber-like, spool during relative axial movement between the spool and the outer shell and inner plunger member to develop shear and sliding friction damping forces in said spool 2. A vibration damping mount comprising an outer cylindrical shell member having portions of the top thereof shaped to provide inwardly extending, radially directed obstructions, a cylinder of resilient, rubber-like, material arranged within said outer shell member with the outer cylindrical surface thereof contiguous to and slidable axially along the inner peripheral wall of said outer shell, the upper end of said resilient cylinder having portions engageable with the obstructions at the top of the outer shell to prevent free movement of the resilient cylinder longitudinally of the outer shell member towards the top thereof, said resilient cylinder having a bore therein that is eccentrically positioned with respect to the longitudinal axis of the cylinder, an inner plunger member arranged within the bore in said resilient cylinder having the peripheral outside surfaces thereof contiguous to and slidable axially along the bore in the resilient cylinder, said inner plunger member having obstructions connected thereto engageable with the lower end of the resilient cylinder to obstruct movement of the resilient cylinder lengthwise of the inner plunger member towards the bottom thereof and means engaged with said resilient cylinder to prevent relative rotation between the plunger member and the resilient cylinder, said obstructions cooperating with said resilient, rubber-like, spool during relative axial movement between the spool and the outer shell and inner plunger member to develop shear and sliding friction damping forces in said spool.

3. In a motor vehicle, a power plant, a chassis frame, and means to resiliently mount said power plant on said chassis frame comprising a chassis frame supported, resilient, mount for one end portion of the power plant and a pair of transversely spaced, chassis frame supported, resilient mounts for transversely spaced parts of the other end portion of the power plant, said pair of resilient mounts each comprising a tubular, open-ended, outer shell member connected to said power plant and arranged with their longitudinal axes extending at an acute angle to a horizontal plane and converging downwardly towards the bottom of the power plant, said outer shell member having radially inwardly directed flange portions providing abutment means at its upper end extending across at least a portion of the open upper end thereof, a resilient, rubber-like, sleeve member mounted within the outer shell member having its outer side surfaces contiguous to and slidable axially along the inner side surface of the outer shell member, said resilient sleeve member having a longitudinally extending bore therethrough eccentrically positioned so that the major portion of the resilient, rubber-like, material is positioned on the upper side thereof, an inner plunger member mounted within the bore in the resilient sleeve member with its outer side surfaces contiguous to and slidable axially along the inner bore surfaces of the resilient sleeve member, abutment means carried by the inner plunger member extending beneath a portion of the open lower end of the resilient sleeve member to restrict relative longitudinal movement between the resilient sleeve member and the inner plunger member in one direction, and means fixedly connecting the inner plunger member to the chassis frame, said abutment means engageable with the opposite ends of the rubber-like sleeve member limiting the relative axial movement between the sleeve member and the inner plunger and the outer shell member which results from sliding movement therebetween, said abutment means further cooperating with the rubber-like sleeve member during axial movement thereof to develop shear in the rubber-like sleeve member that assists the sliding friction action in damping vibrations transmitted to the mounts for said other end portion of the power plant.

4. A vibration damping engine mount comprising a pair of telescopically arranged, spaced, shell members, a resilient, rubber-like member arranged between, in contact with, and slidable longitudinally along the adjacent side walls of the spaced shell members, said resilient member having a longitudinally extending bore therein to receive the inner shell member that is offset from the geometrical center of the shell members, and abutment means on one end of each of the shell members arranged to restrict relative longitudinal movement between the resilient member and each of the shell members in each longitudinal direction, said abutment means engaging the opposite ends of the rubber-like member during longitudinal sliding movement thereof along said shell members and developing shear in the rubber-like member that assists the sliding friction developed during said sliding movement to damp vibrations transmitted to said engine mount.

5. A vibration damping engine mount comprising a pair of telescopically arranged, spaced, shell members, a resilient, rubber-like, member arranged between, in contact with, and slidable longitudinally along the adjacent side walls of the spaced shell members, said resilient member having a longitudinally extending bore therein to receive the inner shell member that is offset from the geometrical center of the shell members, means on one end of each of the shell members arranged to restrict relative longitudinal sliding movement between the resilient member and each of the shell members in each longitudinal direction and abutment means on at least one of the shell members to prevent rotation of the resilient member with respect thereto, said abutment means engaging the opposite ends of the rubber-like member during longitudinal sliding movement thereof along said shell members and developing shear in the rubber-like member that assists the sliding friction developed during said sliding movement to damp vibrations transmitted to said engine mount.

References Cited in the file of this patent

UNITED STATES PATENTS

| 1,830,118 | Lord | Nov. 3, 1931 |
| 2,066,530 | Hoffman | Jan. 5, 1937 |
| 2,468,900 | Thiry | May 3, 1949 |
| 2,658,710 | Titus | Nov. 10, 1953 |
| 2,724,770 | Onksen | Nov. 22, 1955 |

FOREIGN PATENTS

| 486,333 | Great Britain | June 2, 1938 |
| 679,404 | Great Britain | Sept. 17, 1952 |